US008693091B2

(12) United States Patent
Szabó et al.

(10) Patent No.: US 8,693,091 B2
(45) Date of Patent: Apr. 8, 2014

(54) OPTICAL MICROSCOPE SYSTEM AND METHOD CARRIED OUT THEREWITH FOR RECONSTRUCTING AN IMAGE OF AN OBJECT

(75) Inventors: Gábor Szabó, Szeged (HU); Miklós Erdélyi, Erdélyi (HU); Gábor Gajdátsy, Nagyvenyim (HU); László Dudás, Beremend (HU)

(73) Assignee: Szededi Tudomanyegyetem, Szeged (HU)

( * ) Notice: Subject to any disclaimer, the term of this patent is extended or adjusted under 35 U.S.C. 154(b) by 770 days.

(21) Appl. No.: 12/867,984

(22) PCT Filed: Sep. 1, 2008

(86) PCT No.: PCT/HU2008/000099
§ 371 (c)(1),
(2), (4) Date: Aug. 17, 2010

(87) PCT Pub. No.: WO2009/030966
PCT Pub. Date: Mar. 12, 2009

(65) Prior Publication Data
US 2011/0261447 A1    Oct. 27, 2011

(30) Foreign Application Priority Data
Sep. 3, 2007  (HU) ..................................... 0700569

(51) Int. Cl.
*G02B 21/06*  (2006.01)

(52) U.S. Cl.
USPC .......................................... 359/384; 359/385

(58) Field of Classification Search
USPC ................... 359/369, 384, 385; 600/425–429
See application file for complete search history.

(56) References Cited

U.S. PATENT DOCUMENTS 6,738,189 B1    5/2004  Ulrich et al.
7,738,945 B2 *  6/2010  Fauver et al. .................. 600/425
(Continued)

FOREIGN PATENT DOCUMENTS

DE    19654208 A1    6/1998
DE    10209321 A1    9/2003
(Continued)

OTHER PUBLICATIONS

Lin Zhou, Zhihua Ding: "Enhancement of depth resolution in optical coherence tomography by apodization", Proceedings of the SPIE, vol. 5630, No. 1, Jan. 18, 2005, pp. 874-881, XP00259479 chapter 2.2 "Three-zone phase-only filter".

(Continued)

*Primary Examiner* — Frank Font
(74) *Attorney, Agent, or Firm* — Wood, Herron & Evans, LLP

(57) ABSTRACT

An optical microscope system for reconstructing an image of an object includes a means for creating a light beam profile, an optics for directing the light beam profile to the object, a moving means for implementing a scanning of the object with the light beam profile, a rotating means for enabling rotating the light beam profile and the object, and for changing the direction of scanning, and a detector for measuring the intensity of light passing through or reflected by the object. The image may be tomographically reconstructed using this intensity data associated with various directions as a plurality of projections.

18 Claims, 10 Drawing Sheets

(56) References Cited

U.S. PATENT DOCUMENTS

| | | | |
|---|---|---|---|
| 7,872,798 B2 * | 1/2011 | Osawa et al. | 359/385 |
| 2002/0163717 A1 * | 11/2002 | Lee | 359/388 |
| 2005/0200948 A1 * | 9/2005 | Trulson et al. | 359/391 |
| 2006/0012871 A1 | 1/2006 | Funk et al. | |
| 2006/0122498 A1 * | 6/2006 | Sharpe | 600/425 |
| 2007/0076293 A1 * | 4/2007 | Wolleschensky et al. | 359/385 |
| 2007/0282313 A1 * | 12/2007 | Huang et al. | 606/5 |

FOREIGN PATENT DOCUMENTS

| | | |
|---|---|---|
| EP | 1617206 A | 1/2006 |
| EP | 1643292 | 4/2006 |
| JP | 2001255463 | 9/2001 |
| JP | 2004317676 | 11/2004 |
| WO | 9202839 | 2/1992 |
| WO | 2004020996 A | 3/2004 |
| WO | 2004048970 A | 6/2004 |

OTHER PUBLICATIONS

European Patent Office, International Search Report, PCT/ISA/210, Jan. 20, 2009.

Hungarian Patent Office, Office Action.

* cited by examiner

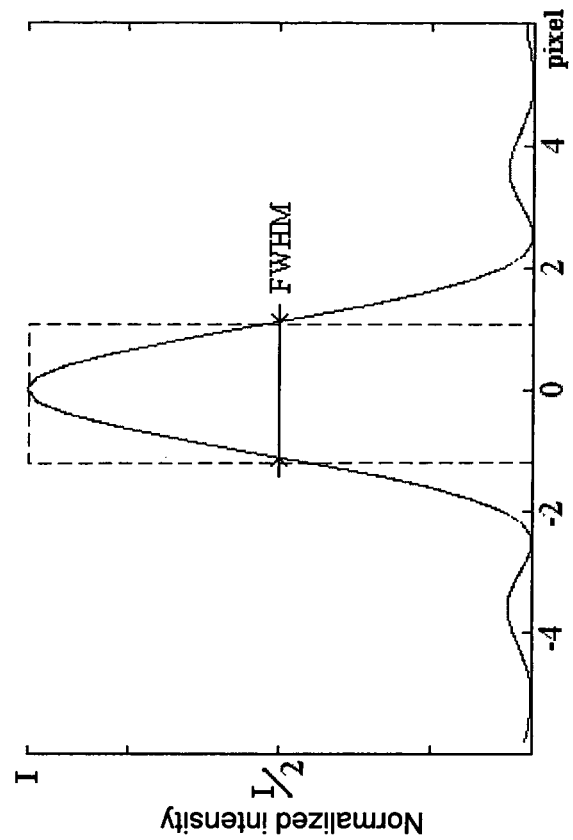
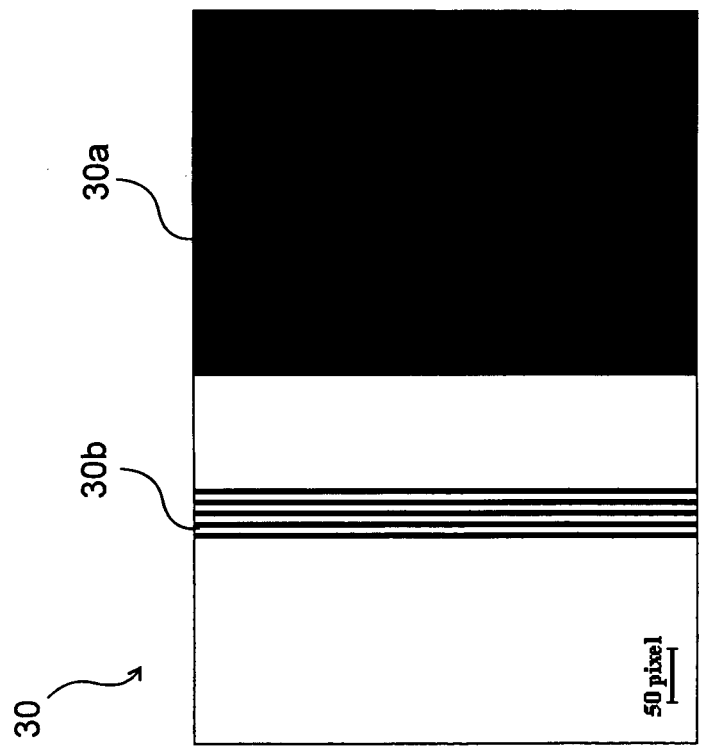
Fig. 4b
Fig. 4a

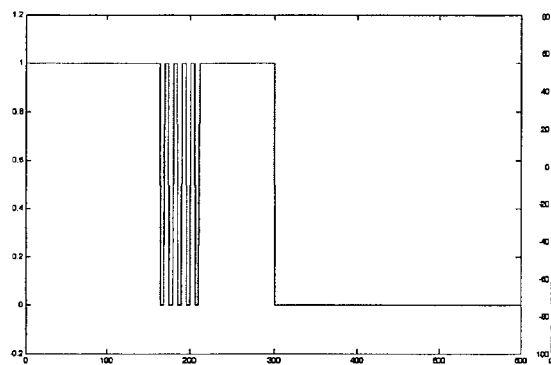
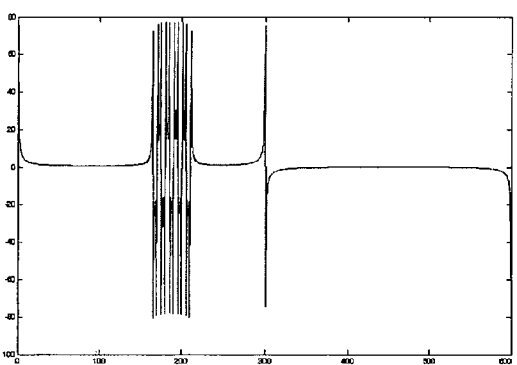
Fig. 8a                  Fig. 8b
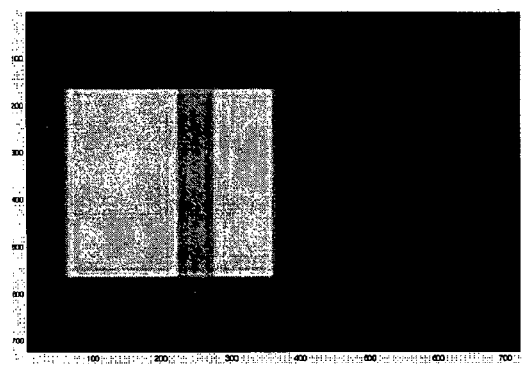
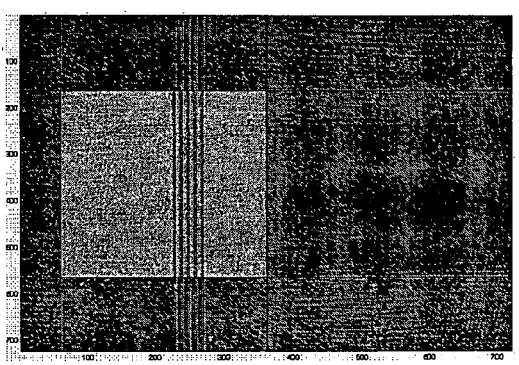
Fig. 9a                  Fig. 9b

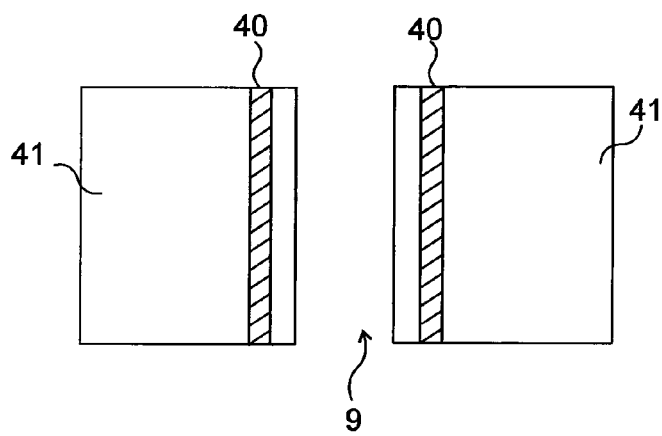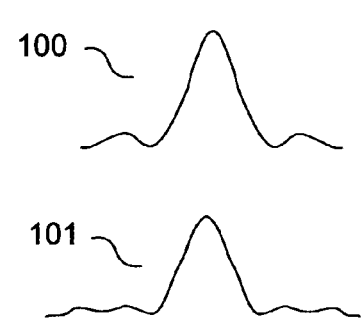
Fig. 10a
Fig. 10b
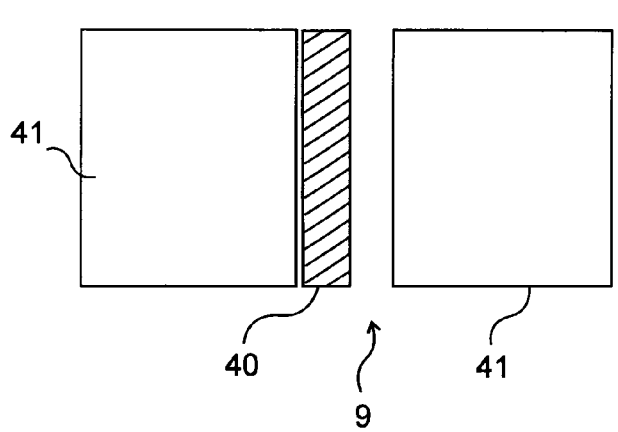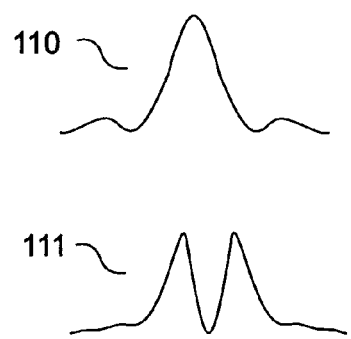
Fig. 11a
Fig. 11b

OPTICAL MICROSCOPE SYSTEM AND METHOD CARRIED OUT THEREWITH FOR RECONSTRUCTING AN IMAGE OF AN OBJECT

This application is a continuation of and claims priority to PCT Application No. PCT/HU2008/000099, entitled "Optical Microscope System And Method Carried Out Therewith For Reconstructing An Image Of An Object" filed on Sep. 1, 2008, which in turn claims priority to Hungarian Application No. P0700569, filed on Sep. 3, 2007.

TECHNICAL FIELD

The invention relates to an optical microscope system and a method carried out therewith for reconstructing an image of an object.

BACKGROUND ART

The most important characteristics of optical microscopes are the lateral resolution and the contrast of the image generated by the microscope, which contrast can be specified by Rayleigh resolution and the optical transfer functions (OTF). The conventional optical microscope is unable to generate an image of objects smaller than the Rayleigh resolution threshold. Resolution is most frequently improved by increasing the numerical aperture of the objective applied, but this is a costly approach in addition to having theoretical and technical limitations. The nearest prior art solutions are considered to be the traditional optical and confocal microscopes. Such confocal microscope is described for example in *J. B. Dawley's Handbook of biological confocal microscopy 2nd ed.* (1995).

DESCRIPTION OF THE INVENTION

It is an object of the invention to provide an optical microscope system and a method, respectively, which use traditional optical components to be able to resolve patterns smaller than the Rayleigh resolution threshold determined by the components and to improve the optical transfer function characterising the microscope.

This objective is achieved with a solution similar to the image reconstruction method known in the field of computer controlled tomography (or shortly CT).

In the imaging used by the CT, the examined object is X-rayed, and the intensity passing through is measured by a detector array located on the side opposite the radiation source. The intensity measured subject to the detector position is one projection of the examined object. When the inspected object is rotated around an axis normal to the plane defined by the detector and the source or when the source-detector pair is rotated around the object and the measurement is repeated, new projections are generated. The combination of projections taken during the rotation is called a synogram.

There are a number of numerical and analytical methods for reconstructing CT images. Such an approach is for example the method of the back-projection of projections, in which case the intensity of a given picture element is obtained by summarising the values of projections passing through the relevant point. The more directions are used to record the projections, the richer in details the reconstructed image will be. However, in the course of back-projection the projections do not only increase the intensity of the relevant picture element, but also that of all the elements along the direction of projection, and therefore, on the one hand, a bright background is generated around the reconstructed image and on the other the contour of the shapes is blurred. Another option is a Fourier's reconstruction process, in the course of which the Fourier transform of one projection determines the Fourier transform of the object along one straight line of the Fourier plane. When several projections are recorded, the Fourier transform of the object can be generated along the whole Fourier plane, and the reconstructed image is obtained as the inverse Fourier transform thereof. The most widespread CT image reconstruction process is the filtered back-projection method, a combination of the back-projection method and the Fourier reconstruction procedure. In the embodiments of the invention to be described later, we have used the filtered back-projection image reconstruction method, but the invention also covers other prior art projection based image reconstructions.

A technology which uses the imaging method of CT apparatuses in optical microscopes, the so-called OPT (Optical Projection Tomography), is also known, being developed e.g. at the MRC Human Genetics Unit (Edinburgh, UK) laboratory. OPT practically applies the CT technology in the optical wavelength range. The examined object is scanned in its whole volume, each projection is measured, and then the three dimensional image of the object is reconstructed therefrom. While in the X-ray range used in the CT the cross section of rays in the total length of the object is much smaller than the size of the picture element used in reconstruction, i.e. the photons behave as small particles and the path of the photon reaching the detector from the source is a straight line with good approximation, however, in the visible wavelength range the errors resulting from light diffraction are non-negligible. When X-ray is applied, each intensity value of the projections depends on the optical characteristics of voxels located along a well-defined straight line. In the case of OPT, the size of the beam increases due to the diffraction, the picture element values being further away from the optical axis also modify the intensity of the beam passing through the specimen. Therefore, OPT is unable to resolve the patterns in the vicinity of and smaller than the Rayleigh resolution threshold and it does not improve the optical transfer function of the microscope either. It is a further disadvantage that the application of the technology is heavily restricted by the thickness of the examined object, because during the process the whole specimen must be scanned.

According to the invention, the resolution of patterns smaller than the Rayleigh resolution threshold and the improvement of the optical, transfer function characterising the microscope are achieved by the optical microscope system according to claim 1, and by the method defined in claim 15.

BRIEF DESCRIPTION OF THE DRAWINGS

Further details of the invention will be described on the basis of drawings by way of embodiment examples, where FIG. 4a is a pattern of an object consisting of one edge and a 10 pixel constant grating, FIG. 4b is a light intensity distribution of a scanning light beam, FIG. 8a is a deconvolution of the projection in FIG. 7a, FIG. 8b is a filtered transform of the deconvolved projection in FIG. 7b, FIG. 9a is an image of the pattern in 4a, reconstructed from the undeconvolved projections, and scanned by a 12 pixel half-width light beam profile, FIG. 9b is an image of the pattern in FIG. 4a, reconstructed from the deconvolved projections, and scanned by a 12 pixel half-width light beam profile, FIG. 10a is a schematic top view illustrating the possible apodisation of a slit, FIG. 10b shows diffraction images of a slit without apodisation and that of a slit with an apodisation as of FIG. 10a, FIG. 11a is a schematic top view illustrating another possible apodisation of the slit, FIG. 11b shows diffraction images of a slit without apodisation and that of a slit with apodisation as of FIG. 11a, and FIG. 12 shows the generating of a projection with an edge and the intensity of light reaching the detector during scanning.

MODES FOR CARRYING OUT THE INVENTION

Figure 1:
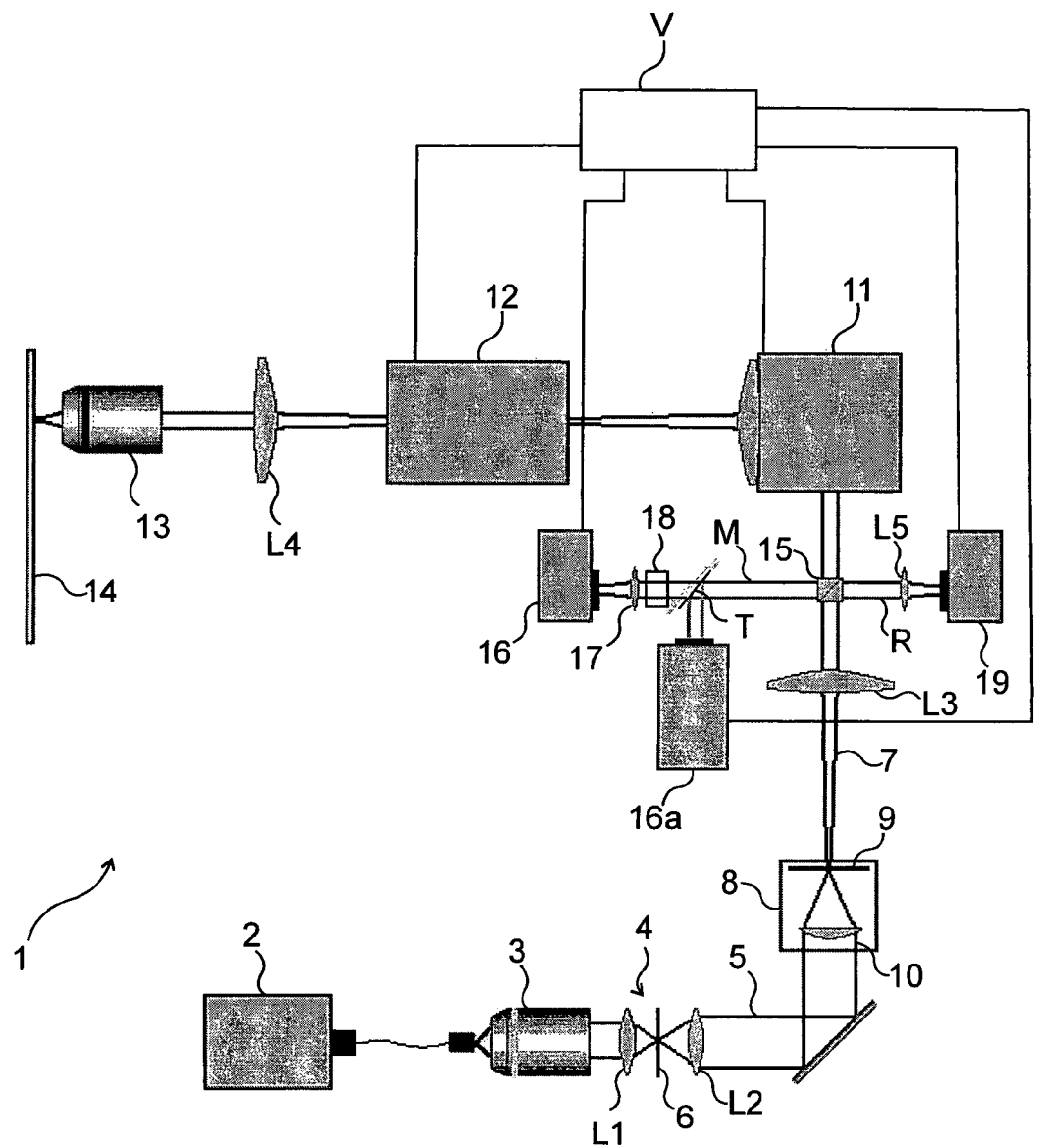
FIG. 1 is a schematic view of a preferred embodiment of the optical microscope system according to the invention.

FIG. 1 shows a preferred embodiment of the optical microscope system 1 according to the invention. We preferably use a laser as a light source 2 of the microscope, but in a broader spectral range, radiating light sources like lamps may be used. From the laser light source 2, preferably by using a first objective 3 and a spatial filter 4, an appropriate known light beam 5 is generated. The spatial filter 4 comprises two planconvex lenses L1 and L2, and a pinhole 6 placed in their common focus. Spatial filtering is not necessary if an appropriately high beam quality light source 2—e.g. lasers coupled to a single mode optical fibre—is used. A means 8 for creating a light beam profile 7 is arranged in the path of the light beam 5, and said means in this case comprises a slit 9 and a cylindrical lens 10 which focuses the light beam 5 to the slit 9. In another preferred embodiment, the slit 9 is replaced by an edge pushed into the path of the light beam 5 or a transparent LCD is used to block one part of the light beam 5, thereby generating the light beam profile 7.

In the case shown in the figure, the light beam profile 7 exiting the slit 9 and collimated by the lens L3 reaches the galvo scanner 11 (galvanometric rotary mirrors), which is a moving means designed for changing in a controlled way the direction of the light beam profile 7, to enable scanning in the relevant direction.

After the galvo scanner 11, an image rotation means 12, a lens L4 and an objective 13 are arranged in this order. The examined object 14 is located on the opposite side of the objective 13.

The focal planes of the lenses L4 and L5 coincide, thereby ensuring that the light beam profile 7 is always incident in space on the aperture of the objective 13. In the course of scanning performed by the galvo scanner 11, only the phase front is tilted on the aperture of the objective 13, and the beam is not shifted in space. The objective 13 focuses the incident tilted phase front light beam profile 7. The (transversal) position of the focus against the object 14 is determined by the tilting angle of the phase front. A projection of a part of the object 14 under the objective 13 is taken by scanning in the relevant direction the light beam profile 7, and this is done by tilting the mirror of the galvo scanner 11. In order to assume a different projection, the light beam profile 7 is to be rotated before it reaches the object 14. This rotation can be implemented in the case shown in the figure by the image rotation means 12 arranged between the lenses L4 and L5.

The object 14 is preferably located on a stage which can be shifted along any axis, and the inclination angles thereof around the axes may also be changed so that an arbitrary part and the plane of the object 14 can be examined. The transversal movement of the light beam profile 7 incident on the object 14 (i.e. scanning in the relevant direction) can be implemented also by a moving means other than the galvo scanner 11, for example by an acoustic optical modulator and by a moving means which transversally shifts the object 14 (i.e. by a shifting which is practically normal to the optical axis of the objective 13). In the latter case, the moving means can be, for example, a means which moves the stage in appropriately small steps, for example a piezo-shifter or an indexing motor.

Similarly, instead of the image rotating means 12 which rotates the incident light beam profile 7 vis-à-vis the object 14, a different rotating means may be applied, for example a rotating means which rotates the object 14 around the optical axis of the objective 13, which said means can be a turnable stage or its rotating structure. It is a further option that the moving or rotating means actuate the means 8 which creates the light beam profile 7 and rotate the said means around its optical axis, respectively. In the latter case, the direction of moving the means 8 is normal to the longitudinal axis of the created light beam profile 7.

The transversal movement of the light beam profile 7 and its rotation around the optical axis are controlled by a control means V. In the embodiment shown in FIG. 1, the control means V controls the galvo scanner 11 and the image rotating means 12. In other embodiments, the control means V controls further means which perform the transversal movement of the object 14 and the light beam profile 7 vis-à-vis each other, and the rotation thereof, respectively. Of course, it is not excluded that the interrelated positions of the object 14 and the light beam profile 7 are manually adjusted, but this is very complicated in the case of a large number of measuring steps.

The microscope system 1 is able to operate in both reflection and transmission modes. We shall restrict ourselves below to presenting the reflection embodiment, on the basis of which the design and operation of the transmission microscope system 1 will be obvious to a person skilled in the art.

The objective 13 collects the light reflected by the object 14, and this light reaches via the path described above the light beam splitter 15 arranged between the galvo scanner 11 and the lens L3. The light beam splitter 15 can be, for example, a semi-transparent mirror which passes one half of the reflected light beam profile 7 in the direction of the lens L3, reflecting the other half to the measuring branch M comprising a detector 16.

Preferably, the detector 16 is an appropriately large surface light intensity measuring means, which meters the full light intensity reflected by the object 14, for example a photoelectron multiplier or a silicon based PIN photodetector. In the relevant case, the signal of the detector 16 is measured by a digitising and data acquisition system (for example the system DAS1414D) which passes the digitised signal to the control means V. The digitising and data acquisition means may also be designed as part of the detector 16 or the control means V.

Preferably, the control means V has an image reconstruction means which reconstructs the image of the object 14. The control means V can be for example a computer and the image reconstruction means can be an appropriate computer programme which reconstructs the image of the object 14 from the projections obtained by each measurement, as described later on. The image reconstructed by the image reconstruction means can be displayed by the control means V or on a separate display means, e.g. a screen.

The intensity of the beam reflected by the object 14 can be decoupled also at other places of the microscope system 1, creating the measuring branch M. It is advisable to decouple at a point where the position of the beam does not change during scanning, like for example in the arrangement shown in FIG. 1, before the galvo scanner 11.

The measuring branch M may also be arranged—with the same design—between the objective 13 and the lens L5. The advantage of this arrangement is that the light beam reflected by the object 14 reaches the measuring branch with a minimal loss, because it does not travel again through the optical components described above. Furthermore, arranged behind the object 14, the microscope system 1 may be used for measurement also in transmission mode.

Preferably, the microscope system 1 is used in a confocal mode in the case of both reflection and transmission modes, i.e. the optics directing the light beam profile 7 to the object 14 have a confocal arrangement, as a result of which the detector 16 senses the change in the intensity of light coming from the relevant plane of the object 14 only. The word 'optics' means the complex of optical components (mirrors, lenses, objectives, and in the relevant case other optical conductors, e.g. optical cables) which guide the light beam profile 7. In a confocal mode, making use of the slit 9, a second conjugated slit 17 is also required as a means 8 for creating the light beam profile, and this slit 17 is to be located before the detector 16 in the measuring branch M, actually in the conjugated plane of the slit 9. Because a reflection microscope system 1 is involved, the reflected light beam profile 7 is focused on the conjugated slit 17 by a third objective 18. In a confocal mode, the optics preferably include both the conjugated slit 17 and the objective 18. The role of the conjugated slit 17 is to screen the reflected light coming from a range of the object 14 outside the examined plane, and therefore—in accordance with the confocal principle—light may only reach the detector 16 from the examined plane of the object 14.

By using the microscope system 1 in a confocal mode, it is also possible to generate the three-dimensional image of the object 14. The reconstructed images associated with the various planes of the object 14 can be assembled to create a three-dimensional image, in a way obvious to a person skilled in the art.

Preferably, the microscope system 1 may be fitted also with other detectors. One part of the light beam profile 7 coming from the direction of the lens L3 is also reflected by the light beam splitter 15, which can be used for setting up a reference branch R. The light reflected by the light beam splitter 15 reaches a second detector 19 via a lens L6 arranged in the reference branch R, and the second detector 19 is preferably also connected with the control means V. The detector 19 may be of the same type as the detector 16. When a semi-transparent mirror is used as the light beam splitter 15, the change in the intensity of the light beam profile 7 reaching the object can be measured accurately. When the lens L6 is replaced by an objective and when a screen or camera substitutes the detector 19, the diffraction image of the slit 9 may be displayed or recorded, and this can be used for making the imaging process more precise to be described later on. The diffraction image of the slit 9 may not only be measured in the reference branch R, but the diffraction image directly illuminating the object may also be examined. When the examined object 14 is removed, the image of the light beam profile 7 created by the objective 14 can be displayed by an appropriately located screen, camera, or another detector.

In the measuring branch M, when a mirror T is pushed into the path of the reflected light beam profile 7, the image of the object 14 can be optionally captured by camera 16a, which may be for example a generally applied CCD camera. The camera 16a is preferably also controlled by the control means V.

By inserting the mirror T and removing the means 8 which generates the light beam profile 7, the microscope system 1 according to the invention can be converted into a traditional optical microscope. In the conventional microscope mode, the galvo scanner 11 and the image rotating means 12 do not play a role and therefore they may also be removed. Using the image recorded by the camera 16a, the object 14 can be easily moved into the image and focus planes of the objective 13. If the light beam profile 7 generating means 8 is removed and the object 14 is withdrawn from the focus plane of the objective 13, the latter can be examined by the camera 16a through illuminating the object 14, which enables a simpler positioning of the object 14.

Figure 2A:
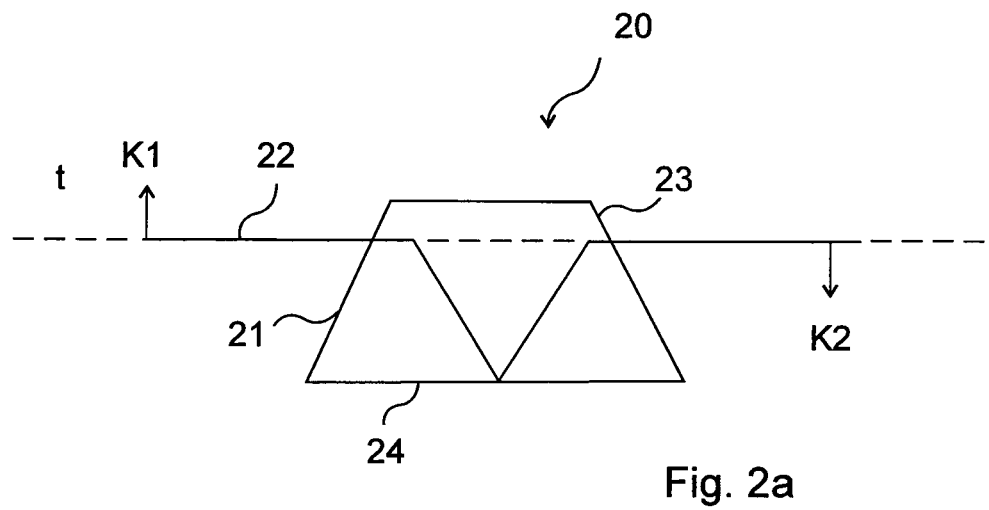
FIG. 2a is a schematic view of a beam travelling through a Dove prism used as an image rotating means.
Figure 2B:
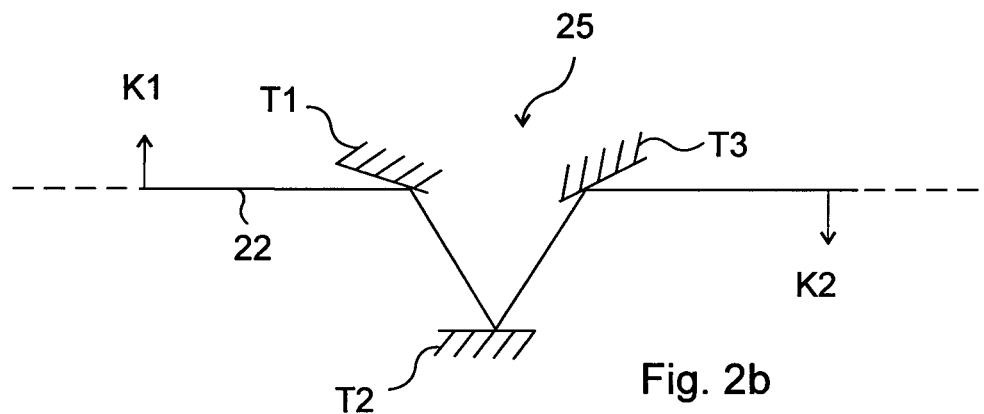
FIG. 2b is a schematic diagram of a beam travelling through a mirror system consisting of three mirrors and used as an image rotating means.
Figure 2C:
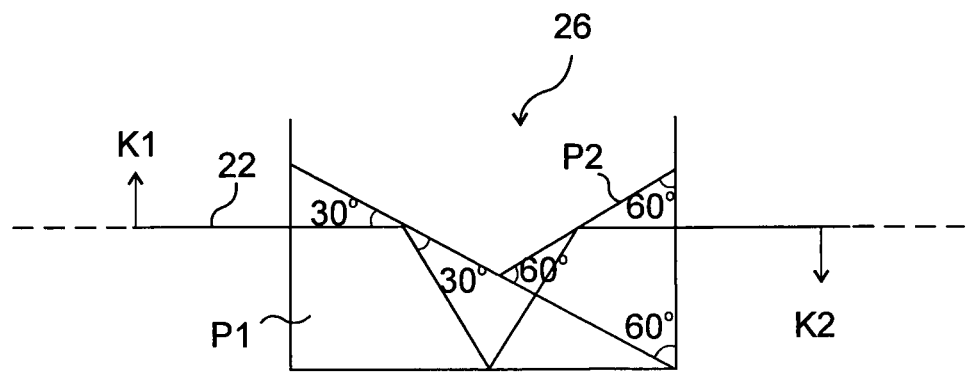
FIG. 2c is a schematic diagram of a beam travelling through an image reversing prism used as an image rotating means.

In FIGS. 2a, 2b and 2c, three preferred embodiments of the image rotating means 12 are shown. In the first case (FIG. 2a), the image rotating means 12 is a Dove prism 20. From a side view, the Dove prism 20 is an isosceles trapezoid, which while being in a straight position, rotates by 180 degrees the image K1 of a beam 22 incident on a lateral face 21 at one side, i.e. an image K2 of the beam 21 exiting at a lateral face 23 at the other side will be in a position rotated by 180 degrees vis-à-vis the image K1 as shown in the figure. When the Dove prism 20 is turned by angle α around its axis t, the image K2 of the object K1 is rotated by angle 2α as against K1. The beam incident on the Dove prism 20 is refracted on the lateral face of the prism 21, then travels on towards the Dove prism 20 base face 24, whence after full reflection it reaches the other lateral face 23. There it is refracted again and hence the beam 22 exits from the Dove prism 20 along the axis t identical with the original axis t, but this is done in a rotated position as illustrated by the pictures K1 and K2. By rotating the Dove prism 20 around axis t, the image K1 of the beam 22 can be rotated around the axis t.

It is a disadvantage of the Dove prism 20 that the beam is subjected to astigmatism while travelling through the prism, because the optical substitute image of the Dove prism 20 is a plan-parallel sheet tilted by 45° as against the optical axis. A further difficulty is presented by the accurate placement of the Dove prism 20 into the beam path, because it is very sensitive to how well its longitudinal axis t coincides with the desired rotation axis of the image rotating means 12 and also to whether the incident beam 22 arrives along the longitudinal axis t. If these axes do not coincide, then during use in the image rotating means 12, the image of the light beam profile 7 is turned along various axes, with the consequence that the projections associated with each scanning direction will show various parts of the object 14.

The embodiments in FIGS. 2b and 2c—the mirror system 25 consisting of three mirrors T1, T2 and T3 as well as the image reversing prism 26 comprising two prisms P1, P2—result in the same image rotating effect as the Dove prism 20. In all the three cases, the beam 22 exits from the image rotating means 12 along the same axis t where it was incident, and the images K1 and K2 are rotated around the axis t by 180 degrees vis-à-vis each other.

It is an advantage of the mirror system 25 shown in FIG. 2b that no optical aberration arises: it is free of astigmatism and the loss of light is minimal. However, it is a disadvantage that the mirrors T1, T2 and T3 must be matched very accurately against each other so that the mirror system 25 can be rotated together when used in the image rotating means 12.

The image reversing prism 26 shown in FIG. 2c in this case is formed by conjoining the two prisms P1, P2, but of course it may also be formed as one component. One of the prisms P1, is a rectangular triangle based prism turned on its lateral face, whereas the other two angles of the rectangular triangle are 30 and 60 degrees. The other prism P2 is an equilateral triangle based prism matching the hypotenuse face of the prism P1. It is an advantage of the image reversing prism 26 that the two prisms P1 and P2 can be matched very accurately and furthermore that the beam 22 is incident perpendicularly on the wall of the prism P1, which makes it easier to position the prism as against the beam 22. The image reversing prism 26 is free of the astigmatism arising in the case of the Dove prism.

By means of the optical microscope system 1, by virtue of the invention, the image of the object 14—or preferably a plane thereof—is generated according to the following discussion.

By means of the means 8, the light beam profile 7 is created, which in this case is the diffraction image of the slit 9. The slit is imaged on the specimen 14 as described above. The apertures and the slit size, respectively, are selected in a way that out of the diffraction orders of the slit, only the zero order is captured by the inlet aperture of the objective 13. By means of the galvo scanner 11, one object 14 part under the objective 13 is scanned throughout (in the case of a small specimen this means the whole object 14, and in the case of a larger surface specimen, the imaging covers one part or part by part of the object 14). In each and every position of the light beam 7, the detector 16 is used to measure the reflected light intensity, which is passed on by the detector 16 to the control means V (in the relevant case via a digitising and data acquisition system), and this is processed by the image reconstructing programme integrated into the control means V. The function of the reflected light intensity in accordance with the position of the light beam profile 7 gives one projection of the image of the object 14. Next, by means of the image rotating means 12, the light beam profile 7 is turned with a given angle around its optical axis and the measurement is repeated, i.e. the object 14 is again scanned throughout by moving the light beam profile 7 with the galvo scanner 11, and the light intensity returned to the detector 16 is measured. From the projections associated with the angles (scanning directions) identified by the image rotating means 12, the control means V and the image reconstruction programme integrated therein reconstruct the image of the object 14, for example by the filtered back-projection image reconstruction method applied in the CT.

Figure 3A:
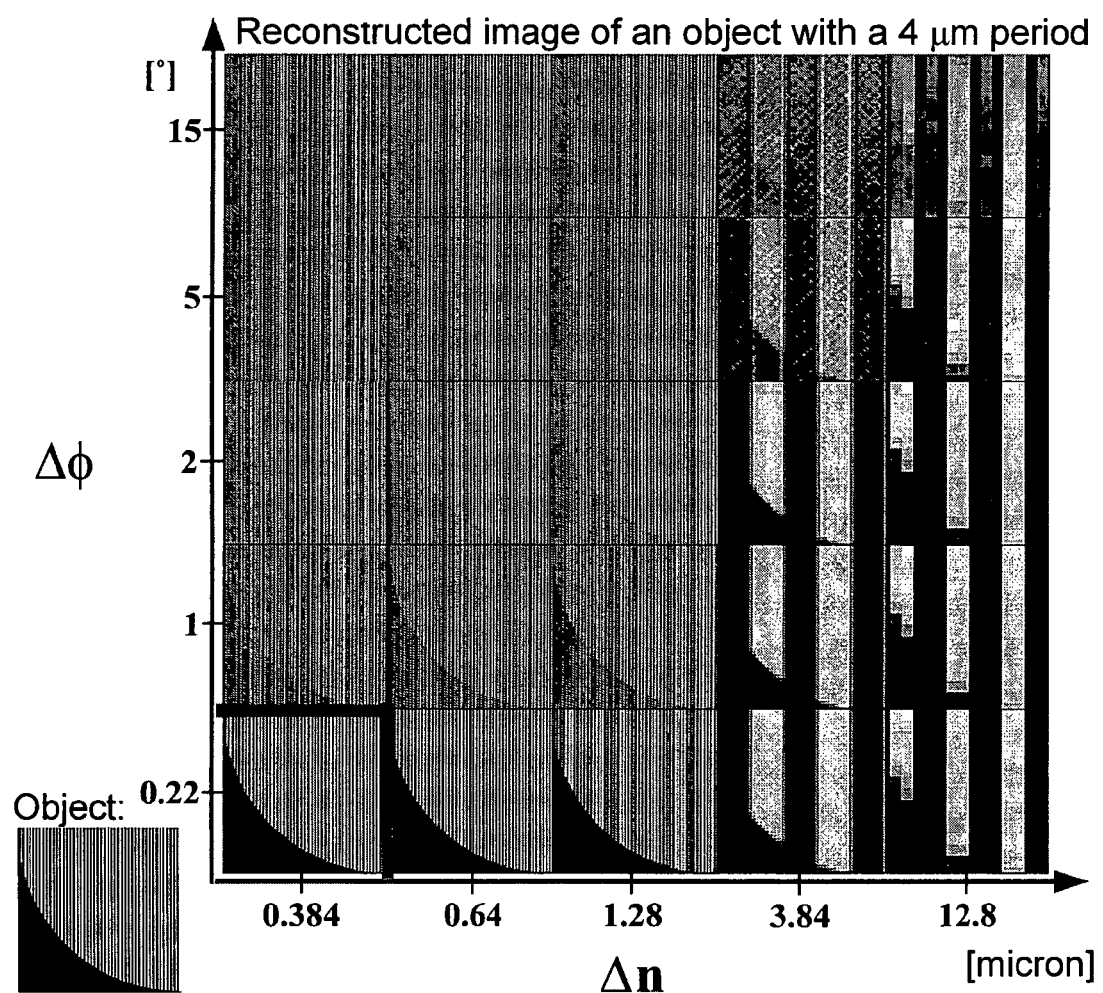
FIG. 3a is a diagram of reconstructed images of a 4 μm period grating obtained by computer simulation, as a function of the value of scanning steps and scanning angles.

The more steps and the more directions are applied in scanning, the better the lateral resolution (i.e. the richer the details of the object 14 image) will be, as shown in FIG. 3a. We have examined by means of a computer simulation what image could be made of the object 14 having a 4 μm period grating pattern as shown in the bottom left corner of FIG. 3a using the microscope system 1 as a function of the number of scanning phases and directions. When the slit 9 is applied in the simulation, it is advisable to move the light beam profile 7 in steps corresponding to the width of the slit 9 by means of the galvo scanner 11, and therefore in this case the narrower slit 9 is assumed, the larger is the number (n) of the scanning steps. Consequently, the scanning step $\Delta n$ (i.e. the value of shift in one step implemented by the galvo scanner 11 during the scanning) corresponds to the width of the slit 9. Because the spatial proportions of the reconstructed image are retained, by increasing the number (n) of the scanning steps, each scanning step $\Delta n$ is reduced. Along the horizontal axis of the chart shown in FIG. 3a, the reconstructed images are arranged according to the increasing scanning steps $\Delta n$. The other parameter of the measurement is the number of projections, described by the angle between the scanning directions yielding each projection (assuming an identical maximum angle between the two most distant scanning directions). The images reconstructed along the vertical axis in FIG. 3a have been arranged during the measurement in accordance with a $\Delta \phi$ angle included in the neighbouring scanning directions. The smaller the $\Delta \phi$ angle, the smaller are the angle increments used in scanning the largest angle (preferably between 0° and 180°) between the two farthest scanning directions, i.e. the more scanning directions are applied, and hence more projections are available for reconstructing the image of the object 14. Accordingly, the closer we get to the origin along the vertical axis, the image quality is gradually better.

As shown, if the scanning increment $\Delta n$ is small, i.e. if many steps are used in scanning, then the number of high frequency components increases in the projections and therefore the edges of the grating lines are well in contrast. In the case of the relevant scanning step $\Delta n$, when the images are viewed along the vertical axis, it is found that the lower the number of scanning directions, the noisier the reconstructed image will be, and then finally the grating pattern of the object 14 cannot be identified at all.

The size of the scanning step $\Delta n$ required for the high quality reconstruction of the object 14 image depends on the fineness of the pattern of the object 14 intended to be examined, and preferably it is one-half of the smallest modulation period of the specimen. When using the microscope system 1, the objective 13 determines how narrow the diffraction image of the slit 9 can be. If it is intended to create the correct image of a smaller period specimen, then the projections are to be recorded with an appropriately small displacement (narrower than the image of the slit 9) of the light beam profile 7 induced by the galvo scanner 11, and then in each projection the deconvolution to be mentioned later is to be applied.

To make sure that it is worth making an image reconstruction at all, scanning must be performed at least from two directions, but preferably from at least 180 directions, and even more preferably from 360 to 1800 directions.

The angle between the neighbouring scanning directions is between 90° and 0.1°, preferably not more than 1°.

Figure 3B:
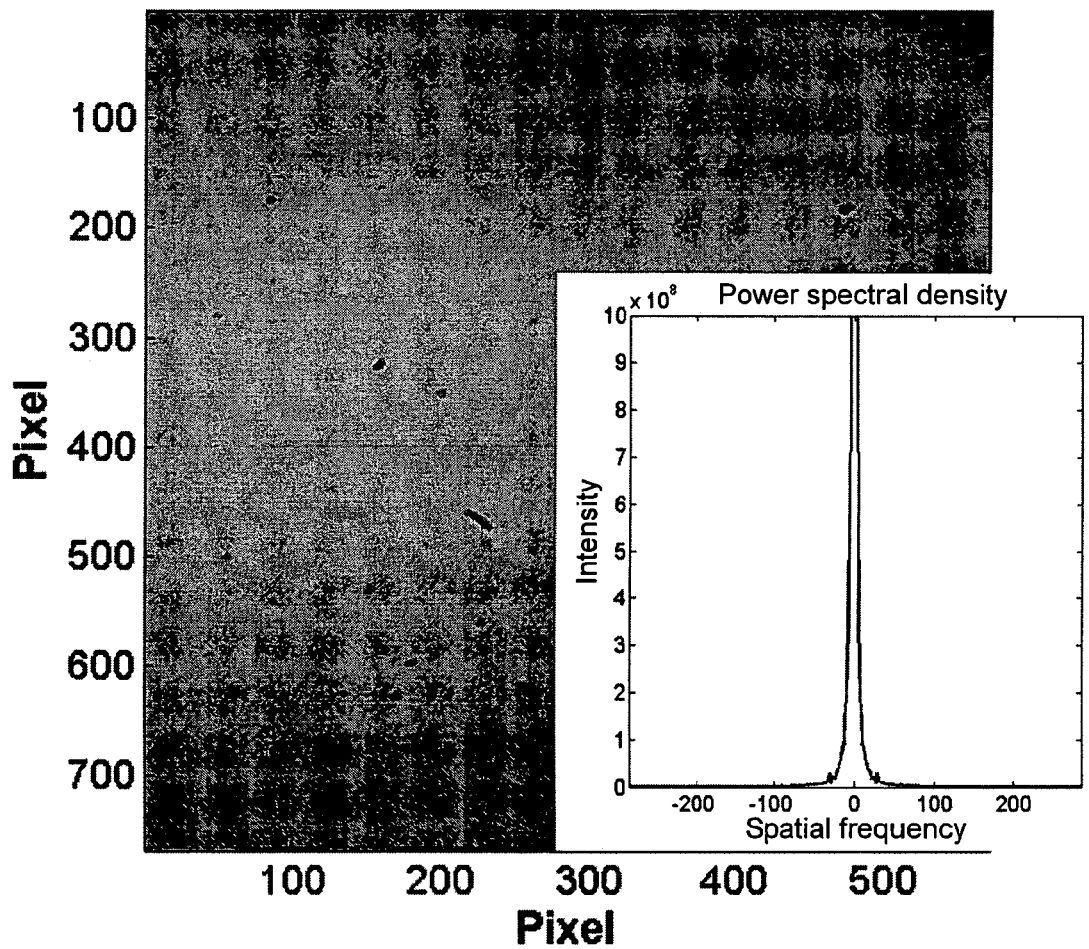
FIG. 3b is an image of a 4 μm period grating captured by a conventional optical microscope and a CCD camera, as well as a spatial Fourier spectrum of a section of the image.

FIG. 3b shows an image of a 4 μm period grating captured by means of a conventional optical microscope and CCD camera, as well as the spatial Fourier spectrum of one section of the image.

Figure 3C:
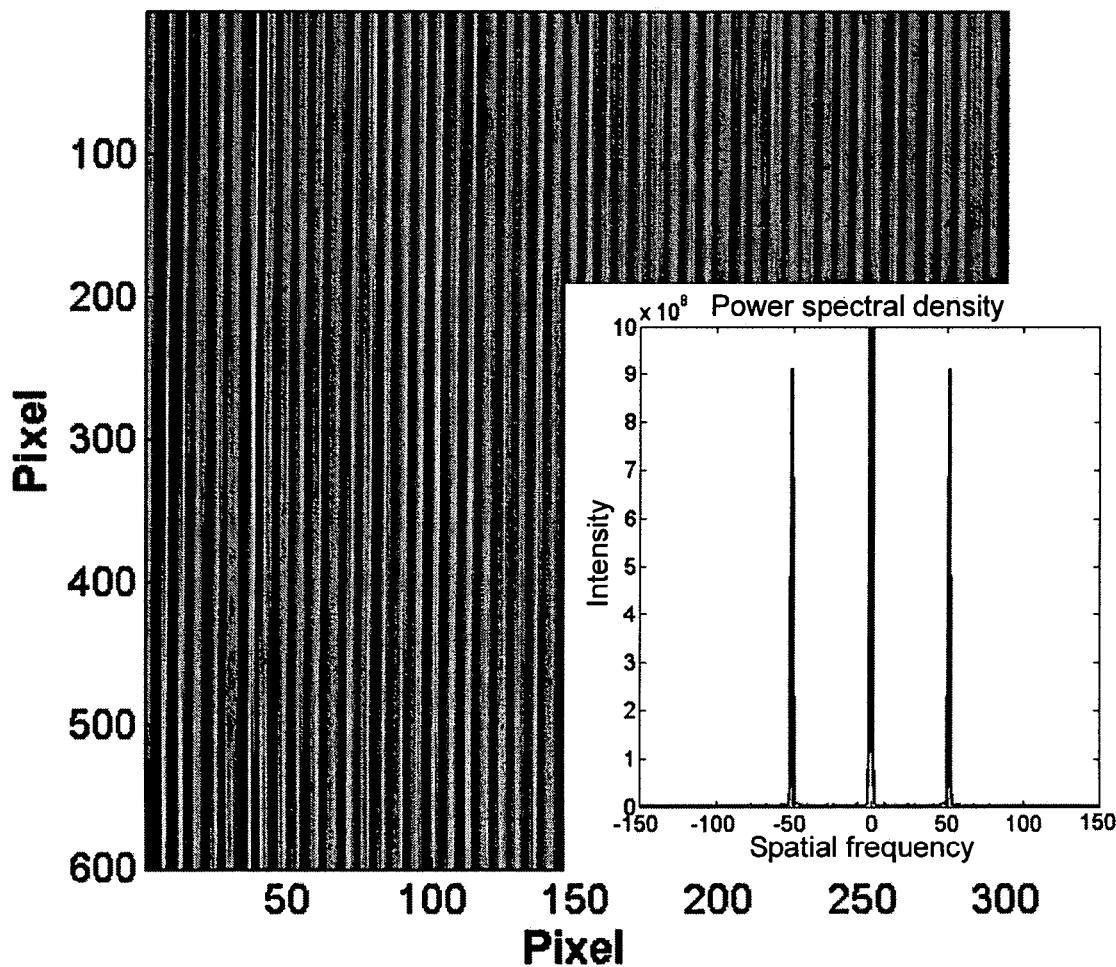
FIG. 3c is a reconstructed image of 4 μm period grating obtained by the method according to the invention and the spatial Fourier spectrum of a section of the image.

FIG. 3c shows the reconstructed image of a 4 μm period grating made by identical optics, but with the method according to the invention, and the spatial Fourier spectrum of one section of the image.

The Rayleigh resolution threshold was 8.25 μm in both cases. As shown in FIG. 3b, the conventional optical microscope is not suitable in this case for resolve the pattern of the 4 μm period grating. On the other hand, when using the method according to the invention, the pattern of the 4 μm period grating can be recognised well in the image reconstructed from the projections (FIG. 3c).

In FIGS. 3b and 3c, the Fourier spectrum of the obtained images is also shown. It is clearly depicted that the spectrum of the image recorded by the CCD camera consists of a single line (associated with the zero frequency), i.e. due to the diffraction the grating pattern cannot be seen at all. On the other hand, in the case of an image reconstructed from the projections (FIG. 3c), two more lines appear in the power spectrum, at the frequencies corresponding to the grating pattern period.

In the course of the process according to the invention, the measured projections can be corrected by deconvolution using the intensity distribution function of the light beam profile 7. The deconvolution will be described below by way of numerical simulations.

FIG. 4a shows a pattern 30 of the object 14 examined by the reflection mode optical microscope system 1, in accordance with FIG. 1. The pattern 30 consists of an edge 30a and a grating 30b located side by side. The edge 30a comprises a translucent (or light absorbing) part and a light reflecting part, in a way that the grating 30b is available in the former means in the form of translucent (or light absorbing) parallel lines. The grating constant of the grating 30b is 10 pixel. The intensity distribution of the illuminating light beam profile 7 generated by the slit 9 (i.e. the diffraction image of the slit 9) is the known function $(\sin(x)/x)^2$ as shown in FIG. 4b (and a constant function in the longitudinal direction of the slit 9). In the course of simulations, we have used various half-width (FWHM) light beam profiles 7 corresponding to the various sizes of the slit 9. FIG. 4b shows the intensity distribution of the 2 pixel half-width light beam 7. If diffraction did not occur at the edges of the slit 9, the intensity distribution of the light beam profile 7 would be a normal squaring function, shown by a dotted line in the figure.

Figure 5A:
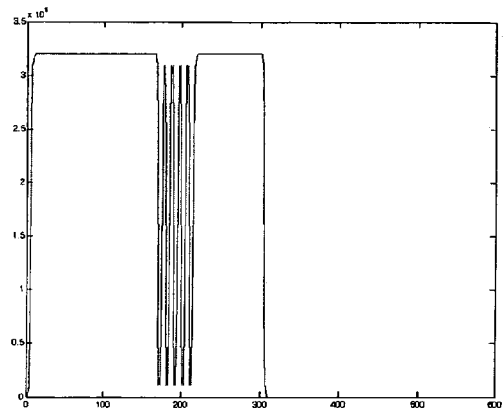
FIG. 5a is a projection of the pattern in FIG. 4a, scanned by a 2 pixel half-width light beam profile.
Figure 5B:
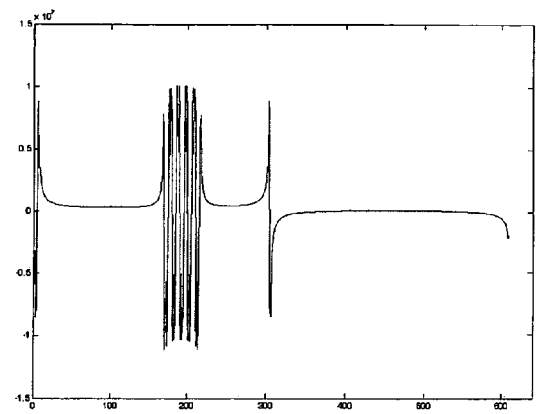
FIG. 5b is a filtered projection of the pattern in FIG. 4a, scanned by a 2 pixel half-width light beam profile.
Figure 6A:
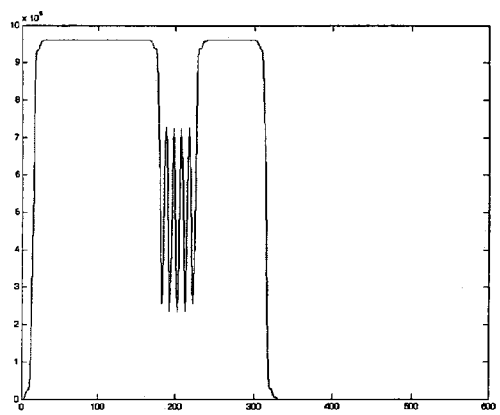
FIG. 6a is a projection of the pattern in FIG. 4a, scanned by a 6 pixel half-width light beam profile.
Figure 6B:
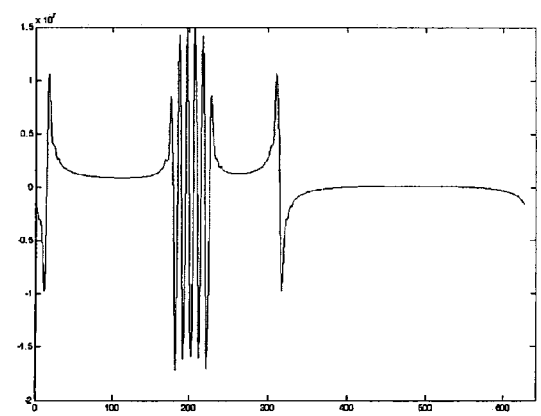
FIG. 6b is a filtered projection of the pattern in FIG. 4a, scanned by a 6 pixel half-width light beam profile.
Figure 7A:
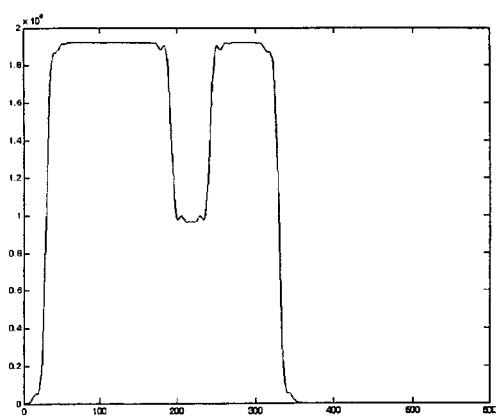
FIG. 7a is a projection of the pattern in FIG. 4a, scanned by a 12 pixel half-width light beam profile.
Figure 7B:
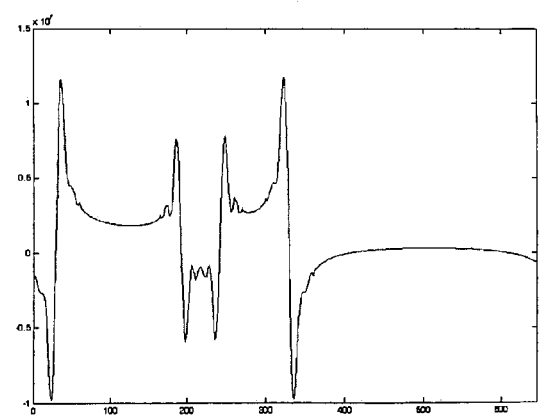
FIG. 7b is a filtered projection of the pattern in FIG. 4a, scanned by a 12 pixel half-width light beam profile.

FIGS. 5a, 6a and 7a show projections obtained by various half-width light beam profiles 7, by simulating scanning normal to the edge 30a and the grating 30b, and the FIGS. 5b, 6b and 7b show filtered projections associated with these projections (which filtered projections are produced by the earlier mentioned prior art filtered back-projection method).

In the case of the charts shown in FIGS. 5a and 5b, the half-width of the scanning light beam profile 7 was 2 pixel, smaller than the grating constant (10 pixel) and therefore the change of intensity between the transparent and non-transparent ranges appear sharply in the projections, i.e. the intensity decreases from the maximum value to nearly zero sharply at the boundary lines.

FIGS. 6a and 6b show the projections associated with the 6 pixel half-width light beam profile 7. As depicted, the refraction is not so sharp along the boundary lines, the edge 30a and the grating 30b appear in a less contrasted way, but a substantial change is not evident in the filtered projection.

If the half-width of the intensity is increased to 12 pixel, FIGS. 7a and 7b are obtained. The 12 pixel half-width is much larger than the smallest resolvable detail (5 pixel) in the pattern 30, and therefore the grating cannot be recognised practically in the projection shown in FIG. 7a, and a different intensity band is visible instead. The filtered projection is not so rich in information.

We have deconvolved the measured projections with the known $(\sin(x)/x)^2$ intensity distribution function of the light beam profile 7. In FIGS. 8a and 8b, the deconvolved factors of the projections obtained with the 12 pixel half-width are shown. As depicted, during the simulation, as a result of the deconvolution, ideal curves are obtained, which are even sharper than the projections associated with the 2 pixel half-width. Of course in the case of real life measurements, ideal curves are never obtained, because the measured projections are loaded with noise. The resolution of the microscope system 1 according to the invention is primarily determined by the measuring noise of the recorded projections. FIGS. 9a and 9b show the image reconstructed from the undeconvolved projections (FIG. 7b) and from the deconvolved projections (FIG. 8b), respectively. Consequently, it can be seen that by correcting the projections with deconvolution, the lateral resolution of the optical microscope system 1 can be further improved: details smaller than the half-width of the scanning light beam profile 7 also become resolvable.

The more accurate knowledge is available about the intensity distribution function of the light beam profile 7, the better result can be achieved by deconvolution. In a theoretical way, the intensity distribution function can be calculated from the diffraction image of the means 8 creating the light beam profile 7 (for example in the case of the slit 9, the function $(\sin(x)/x).\sup2$ is obtained), but it can also be measured by using the reference branch R shown in FIG. 1. By replacing the detector 19 with a screen or camera, the diffraction image of the means 8 can be displayed.

Instead of or simultaneously with the deconvolution, apodisation may also be used for correcting the projections. Apodisation is a known technology, by means of which the intensity distribution of the beam illuminating the sample can be modified. For example, in the case of the slit 9 shown in FIG. 10a, the apodisation is implemented by means of a phase shifting material 40 which compensates the sub-maxima of the slit 9 diffraction image. The slit 9 is confined on each of the two sides by a non-translucent sheet 41, in which the .pi. phase shifter material 40 running in parallel with the longitudinal direction of the slit 9 is inserted at the location corresponding to the sub-maxima of the diffraction image. The light passing through the material 40 due to the π phase shifting is in an exactly opposite phase to the light coming from the slit 9 (which is no other than the sub-maxima), and hence by appropriately choosing the light transmission of the material 40 they practically cancel out each other. FIG. 10b shows a diffraction image 100 of the slit 9 without apodisation and a diffraction image 101 obtained as a result of the apodisation. As shown, from the diffraction image 101 of the slit 9 with apodisation the sub-maxima have practically disappeared.

Apodisation can be implemented also in the case of other light beam profile 7 generating means 8 and apodisation may also be applied in the objective 13 for correcting the lens defects, but these are established methods in the field of optics.

However, apodisation may not be used only for reducing the sub-maxima and for correcting the usual imaging errors. In the case of the slit 9 shown in FIG. 11a, the π phase shifting material 40 is arranged so that it fills up half way the inside of the slit 9, in parallel with the longitudinal axis of the slit 9.

FIG. 11b shows the diffraction images 110 and 111, respectively, of the slit 9 without apodisation and with apodisation as shown in FIG. 11a. As depicted, the diffraction image 111 of the slit 9 with apodisation has two separate peaks, i.e. by inserting the π phase shifting material 40, the half-width determined by the diffraction boundary can be split further. Since in accordance with the discussion above, a smaller half-width represents a larger resolution (FIGS. 4a-9b), through the application of such apodisation it becomes possible to resolve the patterns 30 comprising smaller details.

Figure 12:
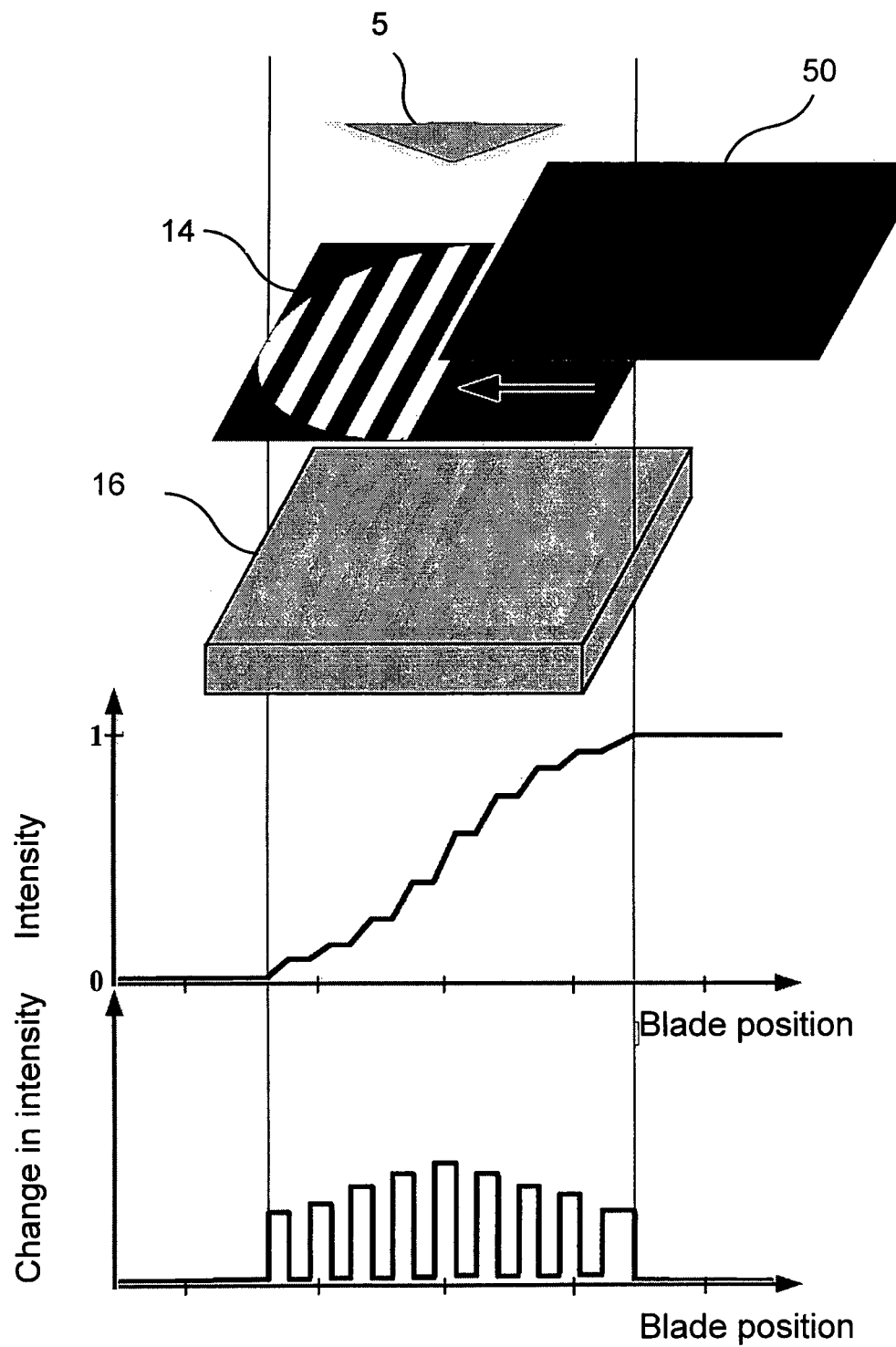

The light beam profile 7 creating means 8 is the edge 50 shown in FIG. 12 in the case of another preferred embodiment of the microscope system 1 according to the invention. When the edge 50 is pushed into the path of the light beam 5 coming from the light source 2, the light beam 5 can be gradually blocked, and hence the light beam profile 7 of varying cross section and confined by an edge can be created. The position of the said light beam profile 7 varies vis-à-vis the object 14 in the sense that the confining edge moves along the surface of the object 14.

In this case the scanning is preferably carried out in a way that the means designed for moving the light beam profile 7 is fitted into the light beam profile 7 generating means 8, for example in the form of a mechanical system for moving the edge 50, and therefore it is not necessary to have a separate galvo scanner 11. Of course, the edge 50 may also be created in a different way, for example optically by means of an SLM (spatial light modulator), and then the means moving the light beam profile 7 is also an element which actuates the edge 50 optically. In both cases it is possible to rotate the edge 50 within the means 8, or the image rotating means 12 shown above can be applied. FIG. 12 shows the principle of using an edge 50. When the edge 50 is pushed in front of the object 14, which in this case is a grating confined by a circle, the detector 16 receives light from a decreasing part of the object 14. When the edge 50 completely blocks the light beam 5, the intensity of the light reaching the detector 16 is zero, as shown by the chart in the figure. In this case the projections do not correspond to the measured intensity curve, but to the light intensity alteration curve, i.e. all projections are obtained as derivates of the measured light intensity curves. Indeed, in the case of the scanning direction shown in the figure (which is normal to the grating lines), the light intensity does not change when crossing the non-translucent lines of the grating. When the edge 50 is moved across the translucent lines (in this case assuming a transmission measurement), the change in light intensity is proportional with the length of the relevant grating line. The projections so obtained yield the reconstructed image of the object 14 on the basis of the description above. It is noted that both deconvolution and apodisation may be applied also in the case of the edge 50, because its diffraction image may also be determined, and it also comprises a sub-maximum.

The disadvantage of using the edge 50 is that since the light beam 5 is screened out in varying extents for creating the light beam profile 7, the light intensity reaching the detector 16 changes between zero and a maximum value, where the former corresponds to the situation when the edge 50 is fully covering, and the latter is associated with the situation when the edge 50 is removed fully from the path of the light beam 5. The detector 16 is to be chosen in a way that it ensures the best possible intensity resolution between the minimum (zero) and the maximum values, i.e. that the maximum of the measured signal is nearly equal to the dynamic range of the detector 16. This means a worse intensity resolution than in the case of scanning with the light beam profile 7 generated by the slit 9, where the detector 16 is also to be selected in a way that the maximum of the measured signal is nearly equal with the dynamic range of the detector 16, but in this case the maximum (which is not more than the narrow illuminating light beam profile 7 generated by the slit 9) and the minimum of the measured signal represent a much smaller intensity range.

It is possible to accelerate the scanning by the joint use of several wavelengths. In the case of two wavelengths, two projections—which are for example normal to each other—can be taken simultaneously. This can be done, for example, by using the laser light source 2 which provides the light beam 5 with two different wavelengths. In the detection, the wavelengths must be separated and their intensity measured simultaneously. The joint application of several wavelengths accelerates the assuming of projections and thereby reduces the time required for making a reconstructed image.

The absorption characterising the material depends on the wavelength of the illuminating light and therefore when examining a complex specimen consisting of several materials, by applying several wavelengths simultaneously, the material structure characteristics of the specimen may also be examined which is a further advantage in addition to shortening the scanning period.

The shortening of the scanning time may be achieved also by several illuminating beams of identical wavelength, but different modulation frequency. In that case the signal of the detector 16 must be separated according to the modulation frequency and this can be implemented for example by a phase sensitive amplifier (Lock-In amplifier).

The quality of the image recorded by a microscope according to the invention is not influenced in merit by the aberrations characterising the objective 13, such as colour failure, spheric aberration or astigmatism, and in case they are accurately known their impact can be eliminated.

A further advantage of the described apparatus and method is that they can be combined with other prior art microscopic techniques (e.g. multi-photon microscopy, use of immersion liquids), thereby extending the field of application.

For those skilled in the art, solutions equivalent with the embodiments described here are conceivable, which are within the scope of the attached claims.

The invention claimed is:

1. A tomographic optical microscope system for reconstructing an image of an object, the system comprising:
   a system optical axis and at least one of a slit or an edge for creating a light beam profile having a diffraction image,
   an optics for directing the light beam profile to the object,
   a moving means for implementing a scanning of the object with the light beam profile such that the diffraction image of the light beam profile illuminates the object for scanning, and the light beam profile moves by the moving means transversally to the system optical axis,
   at least one of a prism or a mirror for rotating the light beam profile with respect to the object, and for changing between a plurality of scanning directions,
   a first photodetector for measuring an intensity of light passing through or reflected by the object as a function of a displacement of the light beam profile in order to generate a projection of the object for each scanning direction, and
   a computer configured to tomographically reconstruct the image of the object from a plurality of the projections.

2. The microscope system according to claim 1, wherein one part of the light beam profile is reflected by a light beam splitter to a second photodetector, wherein the second photodetector is of the same type as the first photodetector and allows to measure a change in the intensity of the light beam profile reaching the object.

3. The microscope system according to claim 1, wherein the light beam profile is the diffraction image of the slit and has an intensity distribution with a constant function in the longitudinal direction of the slit.

4. The microscope system according to claim 1, wherein the system optical axis and the at least one of a slit or an edge comprises an edge insertable into the path of a light beam coming from a light source, the system optical axis and the at least one of a slit or an edge generating the light beam profile of varying cross section and confined by an edge.

5. The microscope system according to claim 3, wherein the slit is provided with a phase shifting material splitting the diffraction image of the slit and filling up a part of the slit.

6. The microscope system according to claim 1, wherein the first photodetector is selected from the group consisting of a semi-conductor based PIN photodetector and a photoelectron multiplier.

7. The microscope system according to claim 1, further comprising a means for examining the diffraction image of the system optical axis and the at least one of a slit or an edge, wherein the means for examining the diffraction image is a screen or a camera.

8. A tomographic method for reconstructing an image of an object with a tomographic optical microscope, the method comprising:
   generating a light beam profile with a system optical axis and at least one of a slit or an edge such that the light beam profile has a diffraction image;
   illuminating the object with the diffraction image;
   scanning the object with the light beam profile along a plurality of scanning directions transverse to the system optical axis,
   moving the light beam profile transversally to the system optical axis to implement the scanning of the object with the light beam profile;
   rotating the light beam profile with respect to the object and changing between the plurality of scanning directions with at least one of a prism or a mirror;
   measuring an intensity of a light passing through or reflected by the object with a first photodetector, wherein the light intensity is measured as a function of the displacement of the light beam profile,
   generating a plurality of projections of the object that respectively correspond to the plurality of scanning directions; and
   tomographically reconstructing the image of the object from the plurality of projections generated from the plurality of scanning directions.

9. The method according to claim 8, wherein the intensity of the light beam profile reaching the object is measured by a second detector being of the same type as the first detector.

10. The method according to claim 8, wherein the light beam profile is created by a slit.

11. The method according to claim 8, wherein the light beam profile is created by an edge pushed into the path of a light beam coming from a light source.

12. The method according to claim 8, further comprising:
   repeating the scanning, measuring, generating, and reconstructing steps for various planes of the object, and
   generating a three dimensional reconstructed image of the object from the reconstructed image of each plane.

13. The method according to claim 8, further comprising modifying the spatial intensity distribution of the light beam profile by apodisation, wherein the light beam profile is split by the apodisation.

14. The method according to claim 8, wherein the scanning is made from at least 180 directions.

15. The method according to claim 8, wherein an angle between adjacent scanning directions is between 90° and 0.1.

16. A tomographic optical microscope system for reconstructing an image of an object, the system consisting of:
   a cylindrical lens for creating a light beam profile,
   an optics for directing the light beam profile to the object,
   a moving motor for implementing a scanning of the object with the light beam profile,
   a rotating element for rotating the light beam profile with respect to the object, and for changing the direction of scanning,
   a first photodetector, being a light intensity measuring means for measuring the full light intensity of light passing through or reflected by the object, wherein the function of the measured light intensity in accordance with the position of the scanning light beam profile gives one projection of the image of the object for each scanning, and
   a computer program for tomographically reconstructing the image of the object from the projections.

17. The method according to claim 14, wherein the scanning is made from 360 to 1800 directions.

18. The method according to claim 15, wherein an angle between adjacent scanning directions is between 1° and 0.1°.

* * * * *